No. 791,382. PATENTED MAY 30, 1905.
J. J. TURRO.
TANK VALVE.
APPLICATION FILED OCT. 5, 1904.
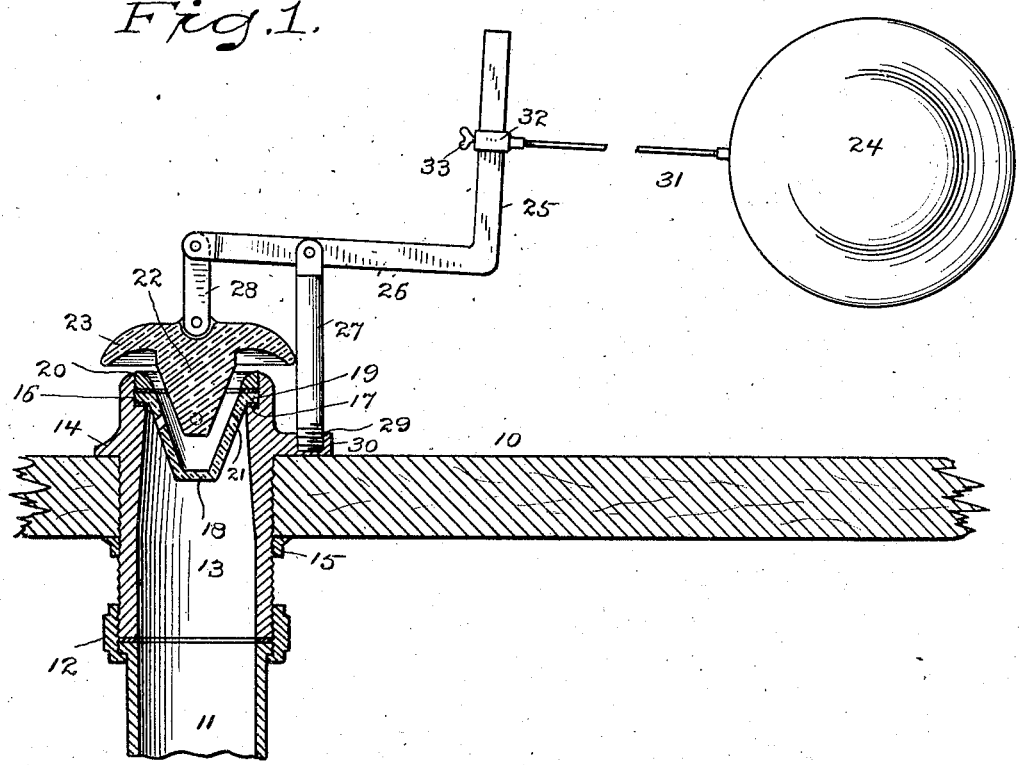
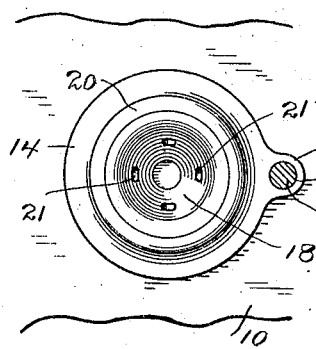
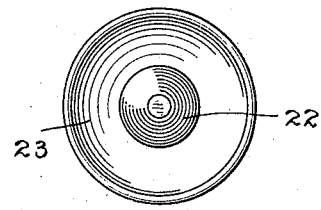
WITNESSES.
H. A. Lamb
S. W. Atherton
INVENTOR.
Joseph J. Turro
By A. M. Wooster
Atty.

No. 791,382. Patented May 30, 1905.

UNITED STATES PATENT OFFICE.

JOSEPH J. TURRO, OF SHELTON, CONNECTICUT.

TANK-VALVE.

SPECIFICATION forming part of Letters Patent No. 791,382, dated May 30, 1905.

Application filed October 5, 1904. Serial No. 227,223.

*To all whom it may concern:*

Be it known that I, JOSEPH J. TURRO, a citizen of the United States, residing at Shelton, county of Fairfield, State of Connecticut, have invented a new and useful Tank-Valve, of which the following is a specification.

My invention relates to the class of valves that are used in reservoirs, cisterns, tanks, and other receptacles for water to shut off the entrance of water thereto when the water in the tank or cistern shall have reached a predetermined height—as, for example, when the tank of a water-closet has filled to the desired height; and my invention has for its object to provide a valve consisting of two operative parts—a valve-disk and a valve-seat—both of which may be made of glass, in which the number of auxiliary parts shall be reduced to the minimum and in which the general construction and arrangement of parts shall be such as to produce a durable and reliable mechanism that will be practically impossible to get out of repair in ordinary use, that will last for an almost unlimited length of time, will be equal to the best of its class now upon the market, and which shall be producible at the lowest possible cost.

With these and other objects in view I have devised the novel tank-valve of which the following description, in connection with the accompanying drawings, is a specification, reference characters being used to indicate the several parts.

Figure 1 is a section of the base of a tank or reservoir, a supply-pipe, and my novel valve and valve-seat, the float and operating-lever being in elevation; Fig. 2, a plan view of the valve-seat, and Fig. 3 is an inverted plan view of the valve-disk.

10 indicates the base of a tank, and 11 a supply-pipe, which is connected, by means of a coupling 12, to a hub 13, which is fixed in the bottom of the tank and extends upward into the tank. I have shown this hub as provided with a flange 14, which rests upon the bottom of the tank, the exterior of the hub as externally threaded, and the hub and supply-pipe as securely locked to the tank by means of a threaded ring 15, which when turned upward on the thread of the hub engages the under side of the tank, as is clearly shown. At the upper end of the hub I provide a threaded circular recess 16, terminating at its lower end in a shoulder 17.

18 denotes the valve-seat, which is preferably made of glass and is in form an inverted hollow frustum of a cone, which extends downward into the hub and is provided at its upper end with a flange 19, which rests upon the shoulder. Packing-washers are placed above and below the flange, and the valve-seat is locked in place by means of a threaded ring 20, which engages the thread of recess 16 and clamps the flange of the valve-seat tightly in place between the packing-rings, so that there can be no possible leakage. The valve-seat is provided, preferably above its midheight, with a plurality of oblique openings 21 for the passage of water when the valve-disk is raised.

22 denotes the valve-disk, which is a solid frustum of a cone, preferably made of glass, and shaped and ground to just fit accurately within the valve-seat, so as to absolutely cut off the flow of water.

At the upper end of the valve-seat is a flange 23, somewhat wider than the hub and made concave on its under side, so that water passing through the hub when the disk is raised will be turned downward by the flange.

In practice the valve is controlled by a float 24, which is adjustably secured to an arm 25, extending from a lever 26, fulcrumed on a standard 27. The valve-disk is connected to the lever by means of a link 28, one end of which is pivoted to the valve-disk, the other to the end of the lever farthest from the float. The standard is shown as secured in place by means of a screw-thread at its lower end which engages a threaded hole 29 in an enlargement 30 of flange 14. The float is shown as carried by a rod 31, the opposite end of which is connected to a band 32, which is adapted to slide on arm 25, said band being locked to the arm by means of a set-screw 33, which enables the operator to so adjust the float as to cause it to close the valve when the water in the tank or reservoir shall have reached any required height.

The operation will be so obvious from the description and drawings as to hardly require further explanation.

The present invention has nothing to do with means by which the water is drawn off from the tank, and no means for drawing off the water has been shown in the drawings. The present invention relates only to the control of the inflow of water. When the tank is emptied, the float of course falls, which raises the valve, as indicated in Fig. 1. It is likewise wholly unimportant, so far as the present invention is concerned, how the water is caused to pass into the supply-pipe. After the water has been turned into the supply-pipe, the valve being raised as in Fig. 1, water will pass into the tank until it shall have risen high enough therein to lift the float and cause it to lower the valve-disk down upon the valve-seat, and thereby shut off the inflow of water.

Having thus described my invention, I claim—

1. A valve of the character described comprising a hub adapted to extend through the base of a tank and having at its upper end a threaded opening terminating at its lower end in a shoulder, a valve-seat in the form of an inverted hollow frustum of a cone and provided with a flange adapted to rest on the shoulder and openings for the passage of water, a threaded ring adapted to engage the thread and lock the seat in place and a valve-disk in the form of a frustum of a cone adapted to fit within the valve-seat and close the openings.

2. A valve of the character described comprising a hub adapted to extend through the base of a tank, a valve-seat in the form of a hollow inverted frustum of a cone secured in the upper end of the hub, and a valve-disk in the form of a frustum of a cone adapted to fit within the valve-seat and close the openings and provided with a flange wider than the hub and made concave on its under side whereby water passing through the hub when the disk is raised will be turned downward by the flange.

In testimony whereof I affix my signature in presence of two witnesses.

JOSEPH J. TURRO.

Witnesses:
   JAMES F. TORRANCE,
   CHAS. J. DICKGIESSER.